United States Patent [19]

Nishiki et al.

[11] Patent Number: 5,676,808
[45] Date of Patent: Oct. 14, 1997

[54] ELECTROLYTIC CELL USING GAS DIFFUSION ELECTRODE

[75] Inventors: Yoshinori Nishiki; Takahiro Ashida, both of Kanagawa; Takayuki Shimamune; Yasuo Nakajima, both of Tokyo, all of Japan

[73] Assignee: Permelec Electrode Ltd., Kanagawa, Japan

[21] Appl. No.: 636,148

[22] Filed: Apr. 22, 1996

[30] Foreign Application Priority Data

Apr. 28, 1995 [JP] Japan ................... 7-129242

[51] Int. Cl.$^6$ ................... C25C 7/00; C25C 7/02
[52] U.S. Cl. ................... 204/252; 204/283; 204/284; 204/290 R
[58] Field of Search ................... 204/283, 284, 204/265, 266, 290 R, 291, 252

[56] References Cited

U.S. PATENT DOCUMENTS

| | | | |
|---|---|---|---|
| 3,864,236 | 2/1975 | Lindstrom | 204/283 X |
| 4,436,608 | 3/1984 | Bennett et al. | 204/283 X |
| 5,047,133 | 9/1991 | Allen | 204/283 X |
| 5,565,073 | 10/1996 | Fraser et al. | 204/265 X |

*Primary Examiner*—Donald R. Valentine
*Attorney, Agent, or Firm*—Sughrue, Mion, Zinn, Macpeak and Seas

[57] ABSTRACT

An electrolytic cell for obtaining a caustic alkali by closely contacting a gas diffusion electrode comprising a gas-liquid permeable metal substrate and a gas-liquid permeable collector connected to the substrate to a cation-exchange membrane while supplying an oxygen-containing gas from the opposite side of the cation-exchange membrane. Grooves for taking out a liquid containing a caustic alkali are formed in the contact surface of the gas diffusion electrode with the cation-exchange membrane.

By the formation of the grooves, clogging of the perforations of the gas diffusion electrode with the caustic alkali so formed is prevented, whereby the gas supply can be smoothly carried out and the electrolysis can be stably carried out without reducing the cell voltage.

5 Claims, No Drawings

ELECTROLYTIC CELL USING GAS DIFFUSION ELECTRODE

FIELD OF THE INVENTION

The present invention relates to an electrolytic cell capable of continuously forming a caustic alkali at a relatively low cell voltage by easily taking out the caustic alkali formed. More particularly, it relates to an electrolytic cell using a gas diffusion electrode capable of operating stably for a long period of time in an alkali solution wherein an oxygen gas exists as in, for example, a sodium chloride electrolytic cell.

BACKGROUND OF THE INVENTION

Industrial electrolyses such as caustic alkali electrolysis perform an important role. However, the energy used for electrolysis is large. Thus, energy efficiency in electrolysis is an important goal.

In caustic alkali electrolysis, an initial mercury method is converted into an ion-exchange method through a diaphragm method resulting in less pollution and energy savings of about 40%. However the cost for the electric powder accounts for 50% of the total production cost.

For further energy savings, the use of gas diffusion electrodes which have been investigated and developed in the field of cells such as fuel cells has been attempted. When the gas diffusion electrode is applied to an ion-exchange membrane type sodium chloride electrolysis which is the most advanced in energy savings at present, energy savings of more than 50% becomes theoretically possible. Accordingly, various investigations have been made to find ways of practically using gas diffusion electrodes.

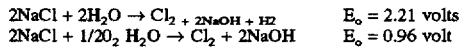

| | |
|---|---|
| 2NaCl + 2H$_2$O → Cl$_2$ + 2NaOH + H2 | E$_o$ = 2.21 volts |
| 2NaCl + 1/2O$_2$ H$_2$O → Cl$_2$ + 2NaOH | E$_o$ = 0.96 volt |

The structure of the gas diffusion electrode used for caustic soda electrolysis is of the so-called semihydrophobic (water repellent) type and is characterized by a hydrophilic reactive layer adhered to a hydrophobic gas diffusion layer. Both the reaction layer and the gas diffusion layer use carbon as the main raw material and a PTFE resin as the binder. The PTFE resin is hydrophobic, and by increasing the proportion of the resin in the gas diffusion layer and reducing the proportion of the resin in the reaction layer by utilizing this property, the aforementioned characteristics are obtained. Furthermore, since in caustic soda electrolysis, the gas diffusion electrode is used in an aqueous caustic alkali solution having a high concentration, the PTFE resin which is a hydrophobic material sometimes becomes hydrophilic. A gas diffusion electrode wherein a thin porous PTFE resin sheet is placed on the gas diffusion layer at the gas chamber side is proposed to prevent this phenomenon.

The surface of the reaction layer carries a catalyst such as platinum, etc., or the catalyst is carried on the surface of carbon constituting the reaction layer. These electrodes are all prepared by using a fluorine resin as the binder, solidifying by heating the fluorine resin together with a carbon powder carrying an electrode substance, and carrying the solidified mixture on a substrate such as titanium, nickel, stainless steel, etc. Production is easy for such electrodes, although such a three-dimensional solid skeleton of forming a strong sheet is not formed as in case of using PTFE, etc. When such a gas diffusion electrode is used as a cathode for carrying out the depolarization of oxygen by sending an oxygen-containing gas, even if the crosslinking of a fluorine resin is insufficient, the gas diffusion electrode can be used under a stable operation condition with a sufficiently satisfactory performance at the beginning of the use since the carried electrode substance can exist stably. However, not only a carbon powder but also a fluorine resin is not always stable in an alkali.

During electrolysis, an oxygen-containing gas is supplied to the gas diffusion electrode, but the oxygen-containing gas forms hydrogen peroxide and the hydrogen peroxide corrodes carbon to form sodium carbonate. Sodium carbonate clogs the gas diffusion layer in an alkali solution, reduces the hydrophobic property of the electrode after extended use and may decrease the activity of the electrode substance. Further, corrosion of the carbon gradually proceeds in the presence of the catalyst metal even when hydrogen peroxide is not generated.

For solving these problems, the selection and the production method of carbon conventionally used, control of the mixing ratio of the resin and carbon, etc., have been attempted. However, the fundamental problem is not thereby solved in any case, and the progress of the corrosion of the carbon can be delayed but cannot be stopped.

In the electrolysis for forming caustic alkali using a gas diffusion electrode, the gas diffusion electrode is closely contacted to a cation-exchange membrane and the caustic alkali is formed between the gas diffusion electrode and the cation-exchange membrane. The caustic alkali is usually removed to the back side of the gas diffusion electrode passing through the reaction layer and the gas diffusion layer of the gas diffusion electrode. However, caustic soda removed in this manner covers the perforations of the gas diffusion layer thereby making the gas supply insufficient. This results in decreasing the uniformity of the electric current distribution and increasing the cell voltage. The disadvantage is not a large problem in a small electrolytic cell of laboratory size, but it is a large problem in an electrolytic cell of industrial size.

The problems described above are the primary reason why gas diffusion electrodes have not been widely used in the process of producing caustic soda (sodium hydroxide) and chlorine by sodium chloride electrolysis or producing caustic soda and sulfuric acid by a Glauber's electrolysis.

SUMMARY OF THE INVENTION

The object of the present invention is to solve the problems of the conventional techniques described above, that is, the disadvantages that caustic alkali formed cannot be easily removed, and to provide an electrolytic cell using a gas diffusion electrode capable of insuring uniformity of the electric current distribution and capable of constraining the increase of the cell voltage by sufficiently carrying out the gas supply.

That is, according to the present invention, there is provided an electrolytic cell in which a gas diffusion electrode is closely contacted to a cation-exchange membrane and a caustic alkali is obtained by carrying out the electrolysis while supplying an oxygen-containing gas from the opposite side of the cation-exchange membrane. The electrode contains grooves for removing a liquid are formed in the contact surface of the gas diffusion electrode with the cation-exchange membrane.

The present invention is an electrolytic cell having a gas diffusion electrode comprising a gas-liquid permeable metal substrate and a gas-liquid permeable collector connected to the substrate which is closely contacted to a cation-exchange membrane. A caustic alkali is obtained by electrolysis while supplying an oxygen-containing gas from the opposite side of the cation-exchange membrane in such an electrolytic cell. Grooves for removing a liquid are formed in the contact surface of the gas diffusion electrode with the cation-exchange membrane.

The grooves formed in the contact surface of the gas diffusion electrode with the cation-exchange membrane accelerate removal of the caustic alkali formed to the circumference of the gas diffusion electrode along the grooves. Thereby, the amount of the caustic alkali reaching the back surface of the gas diffusion electrode passing through the gas diffusion electrode is reduced. Thus, the possibility of clogging the perforations of the gas diffusion electrode with permeated caustic alkali is reduced, the gas supply to the reaction layer of the gas diffusion electrode can be smoothly continued, and the electrolysis can be stably operated for a long period of time.

However, by the grooves, the function of the electrode is reduced, and thus it is desirable that the forming ratio of the grooves to the area of the surface in contact with the cation-exchange membrane of the gas diffusion electrode be not higher than 40%. On the other hand, when the formation ratio of the grooves is too low, removal of the caustic alkali formed becomes insufficient. Hence, it is preferred that the formation ratio of the grooves be not lower than 10%.

There is no particular restriction on the kind of gas diffusion electrode in which the grooves are formed. A gas diffusion electrode comprising a porous sheet substrate formed by silver having on one surface thereof a reaction layer containing a porous silver layer and a mixed layer of a hydrophilic material and a hydrophobic material formed on the surface of the porous silver layer, and on the other surface thereof a gas diffusion layer comprising a hydrophobic porous material, and a gas diffusion electrode comprising a gas-liquid permeable metal substrate having formed on the surface thereof a thin layer comprising a carbon powder and a silver powder and having perforations in the thickness direction can be used. The thin layer may be subjected to a fluorination treatment to fluorinate the carbon in the thin layer and render the carbon hydrophobic. A gas diffusion electrode comprising a gas-liquid permeable metal substrate having formed on the surface thereof a thin layer comprising silver and a fluorinated carbon compound and having perforations in the thickness direction can also be used.

DETAILED DESCRIPTION OF THE INVENTION

The present invention is described in detail below.

The electrolytic cell of the present invention is mainly used as an electrolytic cell for forming caustic soda by electrolyzing sodium chloride or Glauber's salt.

When movement of the caustic alkali formed in the electrolytic reaction for obtaining the caustic alkali (i.e. by closely contacting the gas diffusion electrode to the cation-exchange membrane and carrying out the electrolysis while supplying an oxygen-containing gas from the opposite side of the cation-exchange membrane) is observed, a part of the caustic alkali is removed to the gas chamber side of the electrolytic cell through the gas diffusion electrode. In particular, a part is removed via the perforations, but another part of the caustic alkali moves toward the lower portion of the electrolytic cell through the space between the gas diffusion electrode and the cation-exchange membrane. Since the caustic alkali taken out in the gas chamber side covers the gas diffusion layer of the gas diffusion electrode to hinder the supply of gas, especially in a large-sized practical electrolytic cell, it is important to reduce the amount of the caustic alkali as much as possible.

The inventors have found that it is desirable to reduce the amount of the caustic alkali reaching the gas chamber side passing through the gas diffusion electrode and increasing the amount of the caustic alkali reaching the lower portion of the electrolytic cell by descending between the gas diffusion electrode and the cation-exchange membrane. As a result, the present invention has been accomplished.

First, although a direct means for reducing the amount of the caustic alkali formed passing through the gas diffusion electrode was variously investigated, a means for reducing the permeating amount of caustic alkali while keeping the gas supply at a sufficient level could not be found. Therefore, the present inventors investigated a means of indirectly reducing the amount of the caustic alkali formed passing through the gas diffusion electrode by increasing the amount of the caustic alkali formed to the lower portion of the electrolytic cell.

The present invention features grooves formed in the contact surface between the gas diffusion electrode and the cation-exchange membrane. The grooves accelerate the movement of caustic alkali to the lower portion of the electrolytic cell, and hence the amount of the caustic alkali passing through the gas diffusion electrode can be reduced.

Since the surface of the gas diffusion electrode having the grooves does not cause the electrolysis, it is necessary that the area of the grooved surfaces be as small as possible. If the area of the grooved surfaces is too small, the amount of the caustic alkali moving toward the power portion of the electrolytic cell may be insufficient, and the effect of smoothing the gas supplying is thus not sufficiently improved.

The groove forming ratio to the area of the gas diffusion electrode varies according to the size of the electrolytic cell and electrolytic conditions such as the current density, etc., but is preferably from 3 to 50%, and most preferably from 5 to 40%.

It is preferable that the grooves be formed in a perpendicular direction, that is, in a lengthwise direction so that the caustic alkali formed may be removed and for more quickly removing the liquid containing the caustic alkali. Grooves in a right-angled direction to the lengthwise direction, that is, a horizontal direction may be formed. It is most preferable to form cross-shaped grooves with the two grooves.

It is preferable that the interval between the adjacent lengthwise grooves be from 5 to 20 mm and the width of each groove be about 1 mm. It is not necessary that the width and the interval of the horizontal grooves (grooves crossing the lengthwise grooves at right angle) be the same as those of the lengthwise grooves. For example, it is preferred that the interval of the horizontal grooves be from about 10 to 40 mm. There is no particular restriction on the depth of the grooves, and the depth may be properly selected such that the caustic alkali formed is removed from the interface between the gas diffusion electrode and the cation-exchange membrane. However, considering that the grooved portions do not take part in the reaction, it is desirable that the depth of the grooves be from about 10 to 200 µm as the thickness of laminated silver paste.

There is no particular restriction on the method of making the grooves, but the grooves can be previously formed in the step of preparing the substrate of the gas diffusion electrode, or after forming the substrate, the grooves can be formed by a mechanical process, etc.

For example, the gas diffusion electrode of the present invention may be obtained by sintering a silver powder on the surface of a gas-liquid permeable metal substrate such as a perforated plate comprising silver alone, silver-plated copper or nickel, an expanded mesh, a metal foam, a sintered metal, a metal fiber structural material, etc. to form a thin layer comprising a carbon powder and a silver fiber having perforations in the thickness direction on the surface of the substrate. The thin layer may be further subjected to a fluorination treatment to fluorinate the carbon in the thin layer. Alternatively, a thin layer may be prepared by baking a paste obtained by kneading a silver powder and a fluorinated carbon compound such as a PTFE resin at a temperature of from 200° to 350° C. while applying a pressure of from about 0.1 to 10 kg/cm$^2$ and having perforations on the thickness direction on the surface of the substrate. In this case, the sintering method is optional and, for example, a silver powder having a particle size of from 1 to 10 μm is kneaded with a material such as dextrin, which functions as a binder and is evaporated off by sintering or burning to form a paste. After coating the paste on the surface of the substrate followed by drying, the coated substrate can be sintered in a weak reducing atmosphere such as a hydrogen gas atmosphere at a temperature of from about 350° to 600° C.

During formation of the gas diffusion electrode, a die for forming grooves is applied to the surface of the gas diffusion electrode corresponding to the contact surface with the ion-exchange membrane. This is then pressed to form grooves on the surface thereof. The gas diffusion material may also be sintered in a state such that the die is applied to the surface thereof.

The gas diffusion electrode thus prepared has sufficient catalytic activity as it is but an active catalyst such as platinum, etc., may be carried on the surface thereof. For carrying the catalyst, an ordinary method may be used. For example, a butyl alcohol solution of chloroplatinic acid may be coated on the surface of the substrate, and the chloroplatinic acid may be thermally decomposed by heat-treating the coated substrate in a hydrogen gas atmosphere at a temperature of from about 150° to 250° C. The catalyst carrying may be carried out after rendering the surface hydrophobic as described below.

The surface of the gas diffusion electrode is hydrophilic, and sometimes the removal of the liquid cannot be smoothly carried out as a result. Hence it is preferable that PTFE resin solution be coated on the surface of the gas diffusion electrode and baked at a temperature of from 150° to 250° C. to impart a hydrophobic property to the surface.

Examples of the gas diffusion electrode used in the present invention and the electrolytic cell and method using the gas diffusion electrode are described hereinbelow, but the invention is not limited thereto.

EXAMPLE 1

A silver metal foam having a porosity of 90% and perforations having a hole diameter of from 0.2 to 1 mm was used as a substrate. A suspension of a silver powder having a particle size of from 1 to 5 μm and a PTFE resin was kneaded to obtain a paste. The paste was coated on one surface of the substrate at a thickness of about 200 μm. A die having engraved in the surface thereof lengthwise grooves each having a width of 1 mm and a height of 0.1 mm with an interval of 9 mm (the ratio of the grooves to the whole surface of the die was 10%) was applied to the paste-coated surface of the substrate. The assembly was heated to 300° C. for 20 minutes while applying a pressure of 500 g/cm$^2$ to obtain a silver porous substrate having on the surface thereof grooves of 0.1 mm in depth with an interval of 10 mm.

A suspension of PTFE resin was coated on the opposite surface of the substrate to the surface having grooves and heated to 250° C. for 15 minutes to make the surface hydrophobic. Furthermore, a butyl alcohol solution of chloroplatinic acid was coated on the grooved surface of the substrate and burned for 15 minutes at 250° C. while a hydrogen gas was flowing, whereby platinum was carried on the surface. Thus a gas diffusion electrode was prepared.

The gas diffusion electrode was mounted in the cathode side of a two-chamber type electrolytic cell having a width of 50 mm and a height of 250 mm using a cation-exchange membrane (Nifon, trade name, made by E. I. Du Pont de Nemours and Company) as a diaphragm such that the gas diffusion electrode was in contact with the cation-exchange membrane. A cathode feeder was pressed to the gas diffusion electrode and the gas diffusion electrode was pressed to an expanded mesh having a thickness of 0.5 mm via the cation-exchange membrane to the direction of the insoluble anode carrying Ru-TiO$_2$. When electrolysis was carried out at a current density of 30 A/dm$^2$ while circulating 150 g/liter of an aqueous sodium chloride solution through the anode chamber and supplying oxygen gas saturated with water to the cathode chamber, the cell voltage was 2.4 volts.

COMPARATIVE EXAMPLE 1

By following the same procedure as in Example 1 except that the grooves were not formed, a gas diffusion electrode was prepared. When electrolysis was carried out using the gas diffusion electrode and using the same electrolytic cell under the same electrolytic conditions, the cell voltage became higher than 2.7 volts and stable electrolysis could not be continued.

EXAMPLE 2

By following the same procedure as in Example 1 except that horizontal grooves having the same width and the same interval as the lengthwise grooves were formed in addition to the lengthwise grooves, a gas diffusion electrode was prepared. The ratio of the grooves to the whole surface was 20% by the formation of the horizontal grooves.

When electrolysis was carried out using the gas diffusion electrode and using the same electrolytic cell as in Example 1 under the same electrolytic conditions as in Example 1, the cell voltage became 2.35 volts, which was lower than the cell voltage in Example 1. This was supposed to be because although the area of the electrode was small, retention of the caustic soda formed on the surface was reduced and the gas could be more smoothly supplied than in Example 1. Thus, the cell voltage was lower than that in Example 1.

While the invention has been described in detail and with reference to specific embodiments thereof, it will be apparent to one skilled in the art that various changes and modifications can be made therein without departing from the spirit and scope thereof.

What is claimed is:

1. An electrolytic cell having a gas diffusion electrode comprising
   (1) a gas-liquid permeable metal substrate and
   (2) a gas-liquid permeable collector connected to said substrate,
   wherein said gas diffusion electrode is closely contacted to a cation-exchange membrane and grooves are present in a contact surface of the gas diffusion electrode with the cation-exchange membrane.

2. The electrolytic cell of claim 1, wherein the area of the grooves is from 10 to 40% of the projected area of the electrode.

3. The electrolytic cell of claim 1, wherein at least one surface of said substrate is formed of silver, having on one surface thereof a reactive layer comprising a porous silver layer and a mixed layer of a hydrophilic material and a hydrophobic material, the mixed layer being formed on the surface of said porous silver layer, and having on another surface thereof a gas diffusion layer comprising a hydrophobic porous material closely contacted to a cation-exchange membrane and the gas diffusion layer.

4. The electrolytic cell of claim 1 further comprising a gas-liquid permeable metal substrate having formed on the surface thereof a thin layer comprising a carbon powder and a silver powder and having perforations in the thickness direction, wherein said thin layer contains carbon fluorinated so that it is hydrophobic, and wherein said substrate is closely contacted to a cation-exchange membrane.

5. The electrolytic cell of claim 1, further comprising a gas-liquid permeable metal substrate having formed on the surface thereof a thin layer comprising silver and a fluorinated carbon compound having perforations in the thickness direction which is closely contacted to a cation-exchange membrane.

* * * * *